July 24, 1956
G. B. ENTZ
2,755,789
APPARATUS FOR POSITIONING STONE SLABS WITH
RESPECT TO STONE CUTTING MACHINES
Filed Jan. 3, 1955
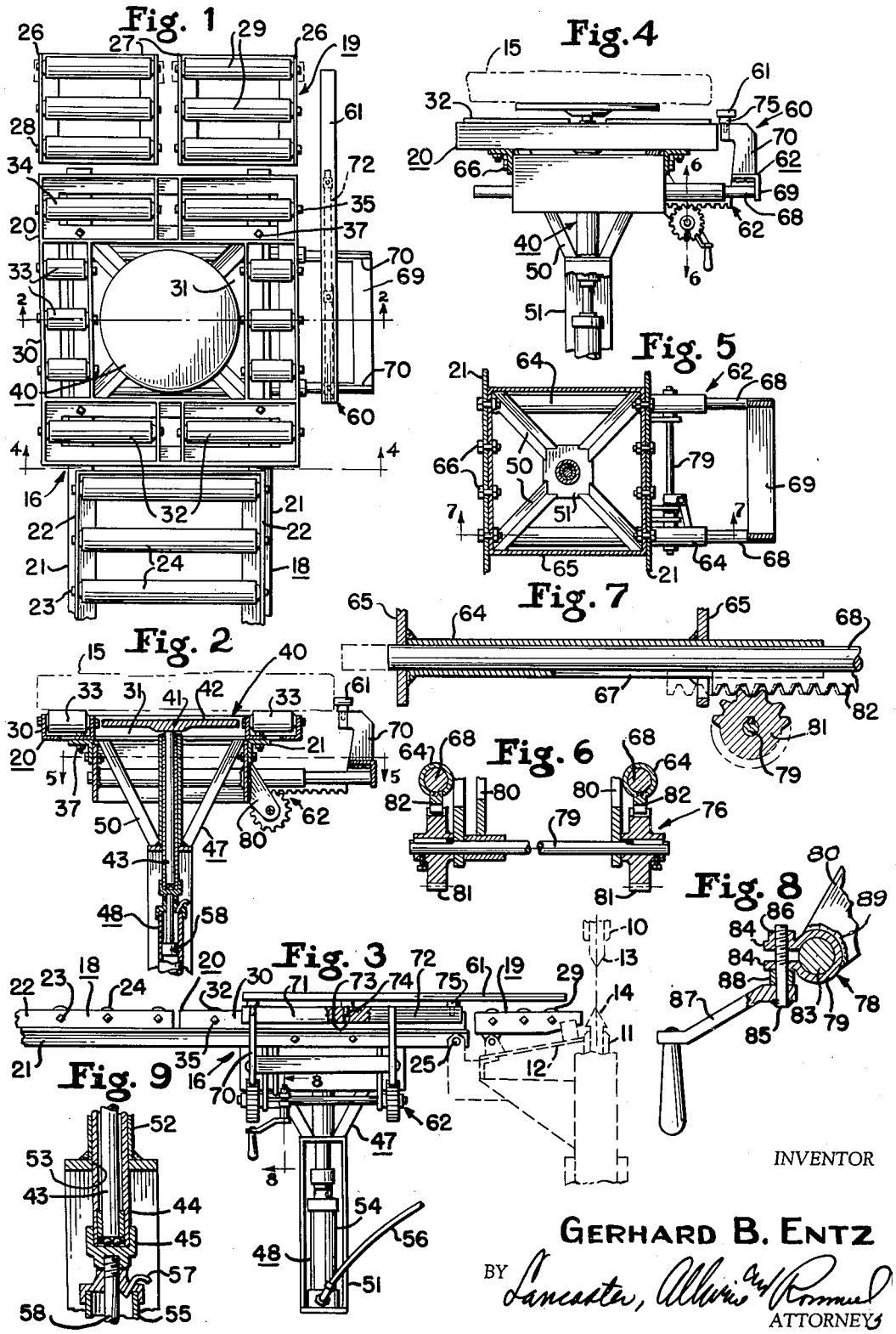
INVENTOR
GERHARD B. ENTZ
BY Lancaster, Allwine and Rommel
ATTORNEYS United States Patent Office 2,755,789
Patented July 24, 1956

2,755,789

APPARATUS FOR POSITIONING STONE SLABS WITH RESPECT TO STONE CUTTING MACHINES

Gerhard B. Entz, Oklahoma City, Okla.

Application January 3, 1955, Serial No. 479,334

8 Claims. (Cl. 125—23)

This invention relates to apparatus for movably supporting, orienting and gaging heavy stone slabs of irregular shapes, in advance of the jaws of stone cutting machines, at which the slabs are cut into strips for use in walls, fireplace facings, etc. and into rectangular pieces for use in floors and sidewalks and as capstones.

The invention is particularly well adapted for use in association with stone cutting machines of the character shown in my copending application, filed November 9, 1954, Serial No. 467,699 in which cutting jaws of considerable length are carried by massive frames, and are arranged in pairs with blades or chisels cooperating to cut pieces from stone slabs disposed between them as the jaws are moved toward each other. The stone slabs, when delivered from the quarry to the zones of the cutting machines, are frequently too long to be fed through the machines without some preliminary trimming. While this trimming may be accomplished by use of hand tools, such is a time-consuming laborious task. Also, when the slabs are cut into strips intended for use in walls, fireplace facings, etc., it has been found desirable to square the ends of the strips, and while this also may be accomplished by the stone mason using hand tools, the procedure is time-consuming, tedious and results in quite an accumulation of debris at the place of the erection of the walls, etc.

While some slabs, especially those which are thin, may be turned by hand, on a skid or rollerway to the desired positions for this trimming and squaring by use of the stone cutting machines, the heavier slabs require the combined effort of two or more men to do so, with the possibility of injuries to hands and arms and back sprains.

The principal object of this invention is to provide apparatus adapted to be located at the intake sides of stone cutting machines of the character described which will do much to aid in the trimming of large slabs and the production of stone strips, squared at ends, capstones, etc., from irregularly shaped stone slabs, at low cost and with saving of time and labor.

Another object is to provide such apparatus, in the nature of rollerways with turntables so located and operated that the stone slabs may be moved by hand along the rollerway over and out of contact with the turntables, when the slabs are thin or of a character that they may readily be oriented by hand manipulation on the rollerways for trimming and squaring of the slabs by use of the machines, or oriented by use of the turntables, if the slabs are thick or heavy.

A further object is to incorporate as parts of such apparatus, gages of adjustable character, located laterally of the turntables and rollerways, whereby, after straight edges on the slabs have been produced, the slabs may be oriented so that the straight edges align with the gages, for rapid and accurate cutting of strips of stone squared at ends, or rectangular pieces, suitable for floors, capstones etc.

Other objects and advantages will appear in the following detailed description of the preferred embodiment of my invention, taken in connection with the accompanying drawing, forming a part of this specification, and in which drawing:

Fig. 1 is a plan view of the apparatus for movably supporting, orienting and gaging stone slabs, constructed according to the present invention.

Fig. 2 is a sectional view on substantially the line 2—2 of Fig. 1.

Fig. 3 is a side elevation of the apparatus shown in Fig. 1, portions of a stone cutting machine being illustrated by dash lines, in operative relation thereto.

Fig. 4 is a vertical sectional view on the line 4—4 of Fig. 1.

Fig. 5 is a horizontal sectional view on the line 5—5 of Fig. 2.

Fig. 6 is an enlarged fragmentary sectional view on the line 6—6 of Fig. 4.

Fig. 7 is an enlarged sectional view on substantially the line 7—7 of Fig. 5.

Fig. 8 is an enlarged fragmentary sectional view on the line 8—8 of Fig. 3.

Fig. 9 is an enlarged detail view, partly in elevation and partly in vertical section at a zone where a turntable is revolubly mounted.

In the drawing, Fig. 3, I illustrate by dash line portions of an upper jaw 10 and a lower jaw 11 in parallel relationship, and a lateral support structure 12 associated with the lower jaw at the entrance or work receiving side of a stone cutting machine of the character disclosed in my aforesaid copending application Serial No. 467,699. The jaws 10 and 11 are provided with knives or cooperating banks of chisels 13 and 14 respectively which, when brought toward one another, will cut a piece of stone, such as waste material when trimming large slabs, so they may be passed through the machine, or squaring the slabs, prior to cutting strips therefrom, and for the production of wanted strips for walls, etc. or rectangular pieces of larger sizes for walks, facings and as capstones. Other types of such stone cutting machines are disclosed in patents to Newsome 1,919,801, July 25, 1933, and Johanning 2,152,193, March 28, 1939. A stone slab or work piece 15 is shown by dot and dash lines in Figs. 2 and 4.

The apparatus for positioning the stone slab 15 with respect to the jaws 10 and 11 is designated generally by the character 16 and preferably includes fore and aft rollerways 18 and 19, respectively, in spaced relation, and in intermediate rollerway 20 disposed between the rollerways 18 and 19. The fore rollerway 18 may be of any desired length and in aforesaid copending application Serial No. 467,699 is shown as a major rollerway extending a considerable distance in advance of the machine, so that laborers may position stone slabs on the remote end portion, while skilled workmen are stationed adjacent the intermediate and aft rollerways for performing duties incident to feeding, trimming, gaging, and operating the cutting machine. In the example shown the fore rollerway comprises spaced parallel rails 21, each of which has secured to its upper surface a longitudinally extending flange member 22, for the support of parallel cross rods 23 on which revolve rollers 24 upon which the work 15 is moved toward the companion rollerways 19 and 20. In the example shown the rails 21 extend all the way to the support structure 12 of the stone cutting machine so as to also act as a support for the intermediate rollerway 20, and may be pivoted thereto as by pivot pin 25 since, in some types of stone cutting machines, the lower jaw moves upwardly for stone cutting operations and it has been found desirable to have the rollerways move with the jaw.

The aft rollerway 19 may be made in two side-by-side sections 26, as shown in Fig. 1, each section comprising a rectangular frame 27, supporting parallel cross rods 28 on which revolve rollers 29. The frames 26 may be supported next adjacent to the work receiving side of the cutting machine with the rollers 29 disposed parallel to the jaws of the machine in any approved manner, such as by being supported on the structure 12 of the machine.

As to the intermediate rollerway 20 it preferably comprises a generally rectangular frame 30, having an inner open zone 31, and fore, side and aft rollers 32, 33 and 34, respectively, supported on rods 35, similar to rods 23 and 28, the rollers 32—34 being disposed with their axes parallel to the jaws 10 and 11 and disposed about the inner open zone 31. The frame 30 may be secured, as by bolts 37 to the rails 21.

To facilitate orienting large or heavy stone slabs with respect to the cutting machine I provide a turntable structure 40, associated with the rollerway 20. This structure is useful when a slab is too wide to go between the frame members of the machine, so that some corner or portions of the slab must first be removed to reduce the width or length of the slab, and where a large slab, even though sufficiently narrow to go between the frame members of the machine, is intended to be cut into strips, sometimes referred to as "strip rubble" or "veneer stone" and it is desired to furnish the strips to the stone mason with the ends of the strips trimmed or squared. The structure 40 preferably comprises a turntable or horizontal disc-like member 41 having an upper or work receiving face 42 and a depending centrally located stem 43, rotatable in a sleeve 44, the lower end of which is closed by a step bearing unit 45 and upon which the lower end of the stem bears.

I provide means 47 normally supporting the structure 40 with the turntable 41 in a first position with its work receiving face 42 in a plane below the upper surfaces of the rollers 32—34 of the rollerway 20, as shown in Fig. 2, and means 48 for raising the turntable to a second position with its work receiving face 42 in a plane above the rollers 32—34, as indicated in Fig. 4.

The means 47 and 48 in the example given, use some of the same parts for accomplishing the objects in view, but, as shown the means 47 may be said to comprise arms 50 extending downwardly from and supported by the frame 30, and inwardly in supporting relationship to the upper end portion an open elongated open frame 51, which frame 51 has secured to its upper portion, a tubular member 52 at its lower end open to an aperture 53 in the top of frame 51, as shown more in detail in Fig. 3, for slidably receiving the sleeve 44; and a strut functioning structure 54 within frame 51, supported by the lower portion thereof and upon which structure 54 the step bearing unit 45 engages when the turntable 41 is in the first position. Then the means 48 may be in the nature of a hydraulic jack in which the structure 54 comprises a cylinder 55 to the lower portion of which a hydraulic line 56 leads, and the upper portion of which is provided with a vent pipe 57 open to the atmosphere: and a plunger 58 guided by and extending from the upper end of cylinder 55 in any approved manner, the plunger preferably being secured to the step bearing unit 45 by having screw threaded engagement therewith.

I provide a gage 60 in combination with the rollerways 19 and 20 which is used when a stone slab has a straight edge and it is desired to make one or more cuts squared with respect thereto. This use may be instances where elongated, rectangular capstones; square tile-like floor units; or, strip rubble squared at ends are to be produced.

The gage comprises an elongated straightedge 61 and means 62 removably supporting the straightedge from the rollerway 20 in a position along one side thereof and also preferably along one side of the rollerway 19, as shown in Figs. 1 and 2, with the axis of the straightedge normal to the axes of the rollers 29, 33 and 34, and with at least a portion of the straightedge above the plane of the tops of said rollers, as shown in Figs. 1–4.

The means 62 is preferably of a type which permits adjustment of the straightedge 61 toward and from the sides of the rollerway. More specifically the means 62, in the example shown, comprises a pair of horizontally disposed, parallel tubes 64 carried by a rectangular frame 65 secured, as by bolts 66 to the rails 21, the tubes each being provided with a slot 67 open to its end and to the interior and exterior at the tube bottom, as shown in Fig. 7; horizontal rods 68 extending into and reciprocable with respect to the tubes 64; a transverse coupling bar 69 secured to adjacent ends of the rods at the sides of the rollerways 19 and 20 adjacent to which it is desired to dispose the straightedge 61; standards 70 supported upon the bar 69 and in turn supporting a rest bar 71 parallel to the coupling bar 69 and preferably having an extending portion 72 disposed near the adjacent end of roller 34, the bar 71 and its extension being provided with recesses 73 open to its upper surface in which pins 74, of spacer blocks 75 carried by the straightedge at its lower surface, extend, thereby detachably connecting the straightedge to the rest bar 71; an equalizing mechanism 76 whereby the rods 68 are coupled to move in unison; and, a locking means 78 cooperating with mechanism 76 to restrain movement of the rods 68 when the gage has been set at its desired adjusted position.

The mechanism comprises a horizontal shaft 79, carried by bearings 80 extending from frame 65, parallel to the coupling bar 69; toothed gear wheels 81 on the shaft 79 beneath the slots 67 of tubes 64; and tooth racks 82, one for each wheel 81, with which the wheels are in meshing relationship, the racks 82 being secured to the undersides of their respective rods 68 and extending downwardly through the slots 67 of the tubes 64.

The locking means 78 may comprise an arcuate band 83, carried by one of the bearings, embracing the shaft 79, as shown in Fig. 8, the band being provided with spaced apertured ears 84 through which a threaded screw 85 extends, one end of the screw having threaded engagement with a nut 86 rigid with one of the ears 84, and the unthreaded end of the screw provided with a crank 87 and spacer ring 88 of which the latter engages the other ear 84. Only a portion of the arcuate band 83 is secured by weld 89 to the bearing 80, so that, upon turning the crank in one direction it, through the screw 85 and nut 86 will draw the band into intimate contact with the shaft 79, whereas, turning of the crank in the opposite direction will, through the screw and nut, loosen the grip of band 83 on shaft 79 and permit the operator to adjust the position of the gage straightedge with respect to the sides of the rollerways 19 and 20.

It is believed operation of the apparatus will be clear from the foregoing description, however, it is pointed out that if the stone slab to be cut is small, it may be manipulated on the rollerway without the use of the turntable. Under such condition, the turntable being normally disposed with its work receiving face below the plane of the upper surfaces of rollerway rollers, it does not interfere with passage of the slab from the fore rollerway over the intermediate rollerway and onto the aft rollerway. The gage straightedge under such condition may be removed from its support or may be drawn outward with respect to the rollerways and retained in a position where it is out of the zone of even larger stone slabs being moved to the cutting machine, upon the rollerways.

Manipulation of the gage is simple both as to adjustment toward and from the rollerways and in the placing and removal of the straightedge. By having the latter extend along the aft rollerway, the stone slab having a straight marginal portion may be guided along the straightedge even when the slab is between the jaws of the cutting machine. Thus the gage is also useful in the cutting of square or oblong units of floor tile-like dimensions or larger, from stone slabs. The gage may be used in cooperation with a cutting machine carried gage, not shown in the present drawings, but a type of which appears in my copending application Serial No. 467,699 for the purpose of producing these floor and other rectangular units.

If the stone slab is very heavy and requires trimming, the workmen may move it along the fore rollerway to a position with its center of gravity somewhere above the zone of the turntable. Then the turntable may be elevated to the position where the work may be swung around or oriented so that a corner or other portion of the slab may be easily moved to position between the cutting machine jaws, after the turntable has been let down to its normal position. After a straight margin along one edge of the slab has been produced, the slab may be drawn back on the aft and intermediate rollerways for further orientation by use of the turntable. The manipulation of the slab on the intermediate turntable may be such as to get this straight margin at right angle to the edges of the cutting machine jaws, whereupon the straightedge may be placed in position on its rest bar, and the slab moved into lined engagement with the straightedge, or if the straightedge is already on its rest bar, the gage may be adjusted from an outward position to one where the straightedge is in line contact with straight margin of the slab and for guiding the slab to the desired position between the jaws of the cutting machine.

I claim:

1. The combination with a stone slab cutting machine of the type including parallel jaws between which a stone slab, constituting the work, is disposed for the purpose of cutting portions therefrom; a rollerway, located adjacent the work receiving side of the machine, comprising a plurality of rollers disposed with their axes parallel to the jaws of the machine and disposed about an inner open zone, a turntable disposed in said zone, first means supporting said turntable in a first position with its work receiving face in a plane below the upper surfaces of said rollers, whereby the work may be moved over said rollers toward the jaws of the cutting machine, and second means for raising said turntable from said first position to a second position with its work receiving face in a plane above said rollers and lowering the turntable to said first position, whereby the work may be moved upon said rollers of the rollerway, toward the cutting machine while said turntable is in said first position, as when the work is properly oriented with respect to the said cutting jaws, or whereby the work may be elevated from said rollers, by movement of said turntable to said second position, oriented with respect to said cutting jaws while supported on the turntable, returned to supported relation upon said rollers upon movement of the turntable to said first position, and subsequently moved upon said rollers toward the cutting machine.

2. The combination as defined in claim 1 in which said first means comprises a frame supported by and depending from said rollerway, and an upright reciprocable with respect to said frame, rotatably supporting the turntable.

3. The combination as defined in claim 2 in which said second means comprises a hydraulic jack, supported by said frame and operatively connected with said upright of said first means for raising and lowering said upright.

4. The combination as defined in claim 1 in which a gage is associated with said rollerway, said gage comprising, an elongated straightedge, and means supporting said straightedge from said rollerway, in a position along one side thereof, with the axis of the straightedge normal to the axes of said rollers, and with at least a portion of the straightedge above the plane of the tops of said rollers.

5. The combination as defined in claim 4 in which said straightedge is detachably carried by its supporting means, and when detached is out of the path of work rotatably supported by the turntable.

6. The combination as defined in claim 4 in which said supporting means includes elements adjustable in directions toward and from said turntable for moving the straightedge to selected gaging positions with respect to the jaws of the cutting machine.

7. The combination with a stone slab cutting machine of the type including parallel jaws between which a stone slab, constituting the work, is disposed for the purpose of cutting portions therefrom; a first rollerway located next adjacent the work receiving side of the machine and including a plurality of rollers, the axes of which are parallel to said jaws, a second rollerway next adjacent to said first rollerway for delivering work upon the latter, said second rollerway comprising a plurality of rollers disposed with their axis parallel to said jaws, and disposed about an open zone, a turntable disposed in said zone, first means supporting said turntable in a first position with its work receiving face in a plane below the upper surfaces of the rollers of said second rollerway, second means for raising said turntable from said first position to a second position with its work receiving face in a plane above the rollers of said second turntable whereby the work may be elevated from said rollers of said second rollerway by movement of said turntable to said second position, oriented with respect to said cutting jaws while supported on said turntable, returned to supported relation upon said rollers of said second rollerway, upon movement of said turntable to said first position, and subsequently moved in operative relation to said cutting jaws while supported on the rollers of said first rollerway, and a gage associated with said first and second rollerways, said gage comprising an elongated straightedge and means supporting said straightedge from said second rollerway, in a position along one side of said first and second rollerways, with the axis of the straightedge normal to the axes of said rollers of said first and second rollerways and with at least a portion of the straightedge above the planes of the tops of said rollers.

8. The combination with a stone slab cutting machine of the type including jaws between which a stone slab, constituting the work, is disposed for the purpose of cutting portions therefrom; fore and aft rollerways in spaced relation and an intermediate rollerway disposed between said fore and aft rollerways, over which the work is moved to the work receiving side of the machine, said intermediate rollerway including a plurality of rollers disposed with their axes parallel and disposed about an inner open zone, a turntable disposed in said zone, means supporting said turntable in a first position with its work receiving face in a plane below the upper surfaces of said rollers, whereby the work may be moved over said fore, intermediate and aft rollerways toward and from the cutting machine, and means for raising said turntable from said first position to a second position with its work receiving face in a plane above said rollers and lowering the turntable to said first position, whereby the work may be successively moved along said fore rollerway to a position on the intermediate rollerway while the turntable is in said first position, elevated and oriented with respect to the cutting machine by use of said turntable, returned to the intermediate rollerway, and moved therefrom and on said aft rollerway to position with respect to the stone cutting machine for cutting operation thereof.

References Cited in the file of this patent

UNITED STATES PATENTS

| | | |
|---|---|---|
| 43,634 | Brombacher | July 26, 1864 |
| 128,817 | Schoettle | July 9, 1872 |
| 277,815 | Wellman | May 15, 1883 |
| 495,683 | Rigby | Apr. 18, 1893 |
| 2,593,606 | Price | Apr. 22, 1952 |